United States Patent [19]

Sato

[11] Patent Number: 5,570,237
[45] Date of Patent: Oct. 29, 1996

[54] LENS UNIT CEMENTED AT CIRCUMFERENCE OF EACH OF LENS ELEMENTS AND OPTICAL SYSTEM INCLUDING THE SAME

[75] Inventor: Susumu Sato, Chiba, Japan

[73] Assignee: Nikon Corporation, Tokyo, Japan

[21] Appl. No.: 225,952

[22] Filed: Jun. 7, 1994

[30] Foreign Application Priority Data

Jun. 11, 1993 [JP] Japan ................... 5-165036

[51] Int. Cl.$^6$ ................................................ G02B 9/00
[52] U.S. Cl. ............................... 359/797; 359/513; 65/38
[58] Field of Search ........................ 359/796, 797, 359/808, 513; 65/38

[56] References Cited

U.S. PATENT DOCUMENTS 5,349,472  9/1994  Terai et al. ........................... 359/649

FOREIGN PATENT DOCUMENTS 59-58410  4/1984  Japan .
63-141011  6/1988  Japan .

*Primary Examiner*—Georgia Y. Epps
*Assistant Examiner*—Dawn-Marie Bey
*Attorney, Agent, or Firm*—Shapiro and Shapiro

[57] ABSTRACT

A circumferentially cemented lens unit includes first and second lenses opposed to each other with a space therebetween on an optical axis thereof. The first lens has a concave surface, part of the second lens is a contact portion disposed radially inward from the periphery of the second lens and is in contact with a peripheral portion of the concave surface of the first lens. The first and second lenses are cemented to each other at a portion radially outward from the contact portion.

27 Claims, 3 Drawing Sheets

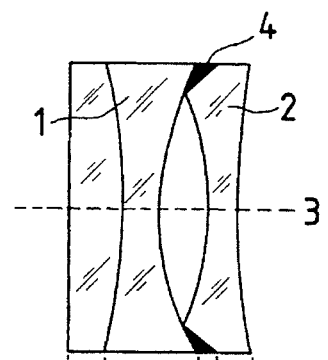
FIG. 1A
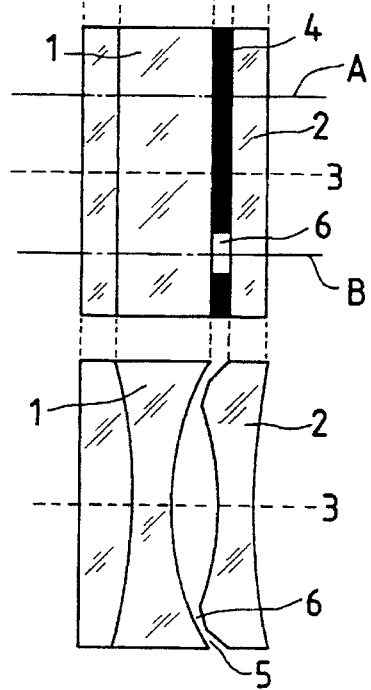
FIG. 1B
FIG. 1C
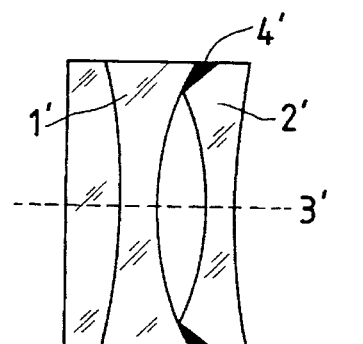
FIG. 2A
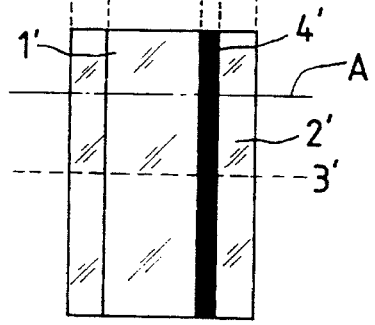
FIG. 2B

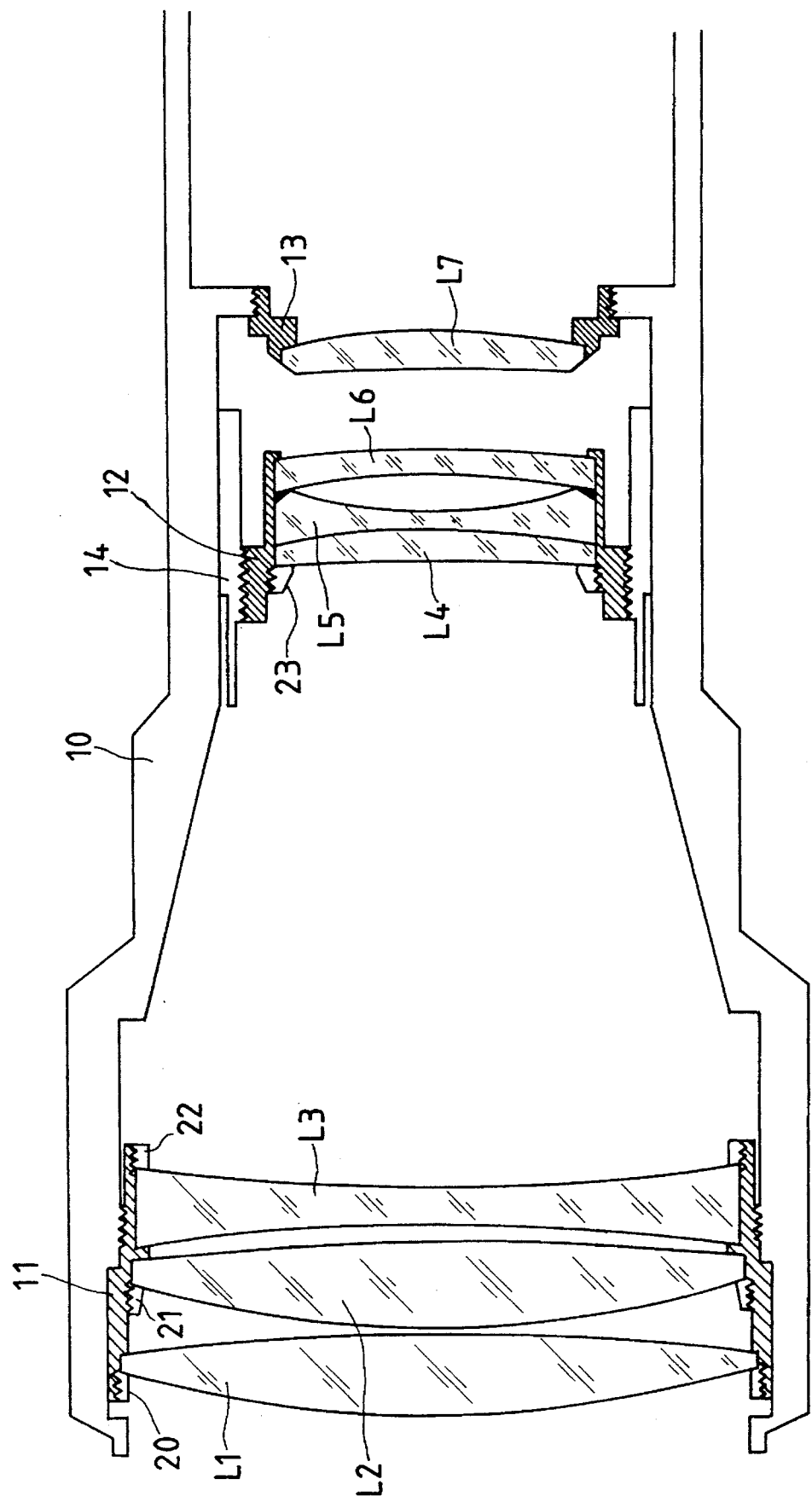

LENS UNIT CEMENTED AT CIRCUMFERENCE OF EACH OF LENS ELEMENTS AND OPTICAL SYSTEM INCLUDING THE SAME

BACKGROUND OF THE INVENTION

1. Field of the Invention

The present invention relates to a lens structure to be incorporated in an optical system and, more particularly, to a circumferentially cemented lens unit obtained by cementing a plurality of single lenses at their circumferences, and an optical system incorporating the same.

2. Related Background Art

Optical axes of single lenses are slightly decentered or deviated from each other because the optical surface of each single lens is a curved surface. For this reason, conventionally, the optical axes of single lenses must be accurately aligned and fixed to constitute a high-precision optical system. That is, centering is generally performed to obtain good optical performance.

An optical system is constituted by a plurality of lens groups. Each lens group is constituted by combining single lenses having characteristics corresponding to a specific application purpose. To combine single lenses to obtain a lens group, a cylindrical lens holder having a diameter almost equal to that of each of the single lenses to be combined is used.

As a general method of housing single lenses constituting a lens group in a lens holder, the single lenses are inserted into the lens holder in an order of combination, the decentered or deviated states of the single lenses are adjusted, and the single lenses are then fixed by a press ring or the like.

In this case, the single lenses constituting the optical system are inserted into the lens holder one by one. In this case, a small space is required between the lens holder and each single lens because the single lenses cannot be smoothly inserted into the lens holder unless the diameter of the lens holder is slightly larger than that of each single lens.

When the single lenses are stored in the lens holder one by one, the opposing optical surfaces of the adjacent lenses may be brought into contact. Sometimes, the contact portion of these adjacent lenses may be deviated from an optimal position. For example, as shown in FIG. 5, when the optical surface of at least one single lens 102 is a recessed curved surface, the adjacent single lens tends to be inclined toward the concave lens surface, and the contact portion is deviated from the optimal position.

In insertion of at least two single lenses into a lens holder, assuming that one lens has a concave lens surface and that this concave lens surface is brought into contact with the other lens, the contact portion is deviated from the optimal position due to the presence of a space between each single lens and the lens holder. As a result, decentering occurs in inserting single lenses into a lens holder.

For example, when a concave lens is inserted into a lens holder as the first lens, it can be housed such that the center of the lens holder is aligned with the optical axis of the concave lens. When a second lens 103 is inclined toward a first concave lens 102, deviation occurs with respect to a central axis 104, as shown in FIG. 5 or 6, regardless of the type (i.e., convex or concave) of the second lens 103.

This lens inclination poses a serious problem in a lens required for a high precision. A cumbersome operation is required for an operator to correct this inclination. In some cases, adjustment is impossible, and decentered single lenses may be fixed in a lens holder.

Decentering is caused by insertion of single lenses into a lens holder in addition to decentering of a single lens itself. In some cases, the optical axes of single lenses are considerably deviated from each other, and a lens group having excellent optical characteristics cannot be obtained. In particular, when a concave lens surface is to be cemented to another concave lens surface, it is difficult to avoid decentering. In formation of a lens group using a lens holder, high-precision assembly free from decentering forces the operator to precisely adjust each single lens, and working efficiency and productivity are degraded.

SUMMARY OF THE INVENTION

It is, therefore, an object of the present invention to provide a lens group in which optical axes of single lenses constituting the lens group are properly aligned, and a lens structure obtained by simply assembling a lens group.

A circumferentially cemented lens unit includes first and second lenses opposing through a space on an optical axis. The first lens has a concave surface, part of the second lens is in contact with the peripheral portion of the concave surface of the first lens. The first and second lenses are cemented to each other at a portion radially outward from the contact portion.

The present invention also provides a lens system including the circumferentially cemented lens unit described above. This lens system includes a plurality of lenses housed in a lens holder such as a lens barrel. At least two of the plurality of lenses are cemented to form the circumferentially cemented lens unit.

In the circumferentially cemented lens unit, the plurality of lenses can be fixed to each other without using any lens holder because the first and second lenses opposing through the space on the optical axis are cemented at the portion radially outward from the contact portion. Therefore, fixing of the plurality of lenses in the lens holder is free from decentering, and a cemented lens can be stably obtained with a high optical precision.

As described above, the single lenses are cemented to obtain a cemented lens. If necessary, this cemented lens is housed in a lens barrel to obtain a highly precise lens system.

According to the present invention, a plurality of lenses are cemented to obtain a first cemented lens element, and the first cemented lens element is incorporated in a lens barrel to obtain a finished optical system. The number of lens elements used in assembly of an optical system can be reduced to improve working efficiency.

A special jig or operation is required for cementing single lenses because they are cemented utilizing peripheral portions which are optically unnecessary portions. Assembly and adjustment are simple, and good workability can be obtained.

According to the present invention, as described above, management cost and material cost, as of a lens barrel, can be reduced. At the same time, a compact optical system can be obtained, and the radial size of a product can be reduced. Another new mechanism can also be arranged in the extra radial space.

The first and second lenses may be cemented continuously along the entire circumferences thereof or at a plurality of circumferential positions. In the latter case, the first and second lenses are temporarily cemented, centering is performed prior to actual mounting of the lenses into the lens holder, and the first and second lenses are actually mounted in the lens holder. When the first and second lenses are temporarily cemented, they must be firmly fixed with a press ring or the like.

More preferably, at least one of the first and second lenses may be chamfered to form a groove open outward with respect to the contact portion, and an adhesive may be filled in the groove. In this case, an adhesive will not swell out from the circumferences of the cemented portions of the lenses to prevent an interference with mounting the cemented lenses into a lens holder. For this reason, the lens surfaces will not be stained with the swollen adhesive, and the first and second lenses are firmly cemented.

When a temperature difference between the outer air and the space in the circumferentially cemented lens unit is increased as in a case wherein a user quickly moves from a cold place to a warm place, the outer lens surface delicately expands while the inner lens surface is kept unchanged or shrinks, thereby degrading the optical precision of the lens surfaces. For this reason, when an air hole is formed in part of the contact portion between the first and second lenses to cause the space to communicate with the outer air, the temperature and pressure differences between the outer air and the space of the circumferentially cemented lens unit can be minimized. A change in shape of the lens surface with an abrupt change in outer temperature can be minimized. Therefore, degradation of the optical precision of the lens surface, which is caused by the change in temperature, can be prevented.

In addition, the first and second lenses having the same circumferential shape can be preferably easily aligned.

In general, a lens is manufactured by machining with reference to the optical axis. The deviation amount of transmitted light of each single lens is not so large (the deviation amount of transmitted light is defined as a deviation angle between the direction of a transmitted beam and the direction of a beam incident on a lens). For this reason, when the first and second lenses having the same circumferential shape are cemented while their circumferences are aligned with each other, the resultant lens unit is free from decentering caused by a fixing tool such as a lens holder. Therefore, a total deviation amount is only a sum of the deviation amounts of transmitted light of the respective single lenses. More specifically, even if the peripheral portions of the first and second lenses are cemented without performing centering, the total deviation amount of the cemented lens unit is generally smaller than 30 minutes. This value sufficiently satisfies conditions under which a large deviation amount of transmitted light does not pose any problem, as in an eyepiece or part of a zoom lens.

In particular, when a concave lens is cemented to a lens brought into contact with the peripheral portion of the concave lens in a minimum deviation amount of transmitted light, i.e., the lenses are cemented while being centered, a cemented lens having a much higher precision than that of a conventional cemented lens is provided. For example, according to the present invention, a lens unit satisfying condition $E_0 < 1.5$ minutes (where $E_0$ is the total deviation amount of transmitted light of the cemented lens) can be easily obtained. The lens unit having this value can be applied to an optical product requiring a considerably high precision.

If a deviation amount of transmitted light of one of the lenses constituting a cemented lens is defined as $E_1$, any lens unit satisfying condition $E_1 < E_0$ can have a total deviation amount of transmitted light to be $E_0$ or less even if the deviation amount of transmitted light of the other lens is larger than $E_0$.

BRIEF DESCRIPTION OF THE DRAWINGS

FIGS. 1A to 1C show a circumferentially cemented lens unit according to an embodiment of the present invention, where FIG. 1A is a sectional view of a portion including a cemented portion, FIG. 1B is a plan view of the lens unit, and FIG. 1C is a sectional view including an air hole portion;

FIGS. 2A and 2B show a modification of the lens unit in FIGS. 1A to 1C, wherein lenses are cemented along the entire circumferences thereof without forming an air hole, thereby constituting a circumferentially cemented lens unit;

FIG. 4 is a sectional view showing a telephoto lens according to still another embodiment of the present invention;

DETAILED DESCRIPTION OF THE PREFERRED EMBODIMENTS

Figure 3:
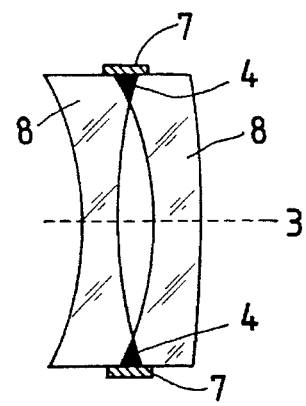
FIG. 3 is a sectional view showing a circumferentially cemented lens unit according to another embodiment of the present invention.
Figure 5:
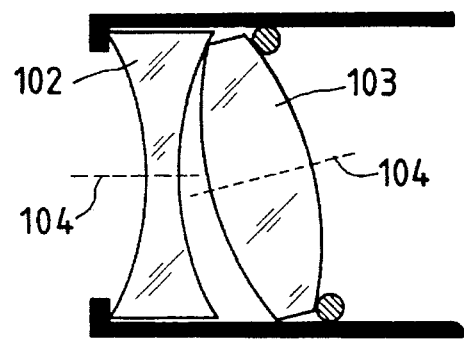
FIG. 5 is a sectional view showing a conventional example.
Figure 6:
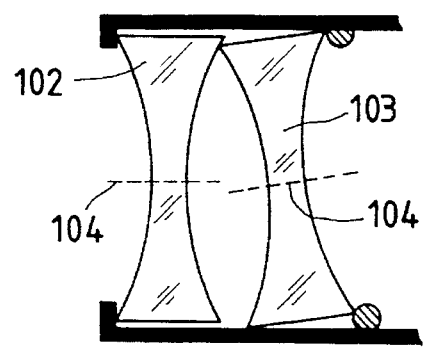
FIG. 6 is a sectional view showing another conventional example.

FIGS. 1A to 1C are views showing the structure of a circumferentially cemented lens unit according to an embodiment of the present invention, where FIG. 1A is a sectional view taken along an optical axis 3 of the lens unit and a line A not passing through an air hole 6 in FIG. 1B, FIG. 1B is a plan view of the lens unit, and FIG. 1C is a sectional view taken along the optical axis 3 of the lens unit and a line B passing through the air hole 6.

The circumferentially cemented lens unit in FIGS. 1A to 1C comprises a cemented lens 1 constituted by a single flat positive meniscus lens and a double concave negative meniscus lens, and a single lens 2 having one concave surface. The cemented lens 1 and the single lens 2 are cemented at their circumferences to constitute the circumferentially cemented lens unit. The peripheral portion of the single lens 2 having the concave surface is chamfered to form an outwardly open groove 5 when the single lens 2 is brought into contact with the cemented lens 1. All the lenses constituting the circumferentially cemented lens unit have the same diameter.

In this embodiment, as shown in the sectional view of FIG. 1A, the cemented lens 1 is abutted against and combined with the single lens 2 having the concave surface, an adhesive 4 is filled in the groove 5 formed by the chamfered portion, and the cemented lens 1 and the single lens 4 are fixed.

In addition, according to this embodiment, an air hole 6 is formed to cause the outer air to communicate with a space between the cemented lens 1 and the single lens 2 having the concave surface, as shown in FIGS. 1B and 1C. Even if the temperature outside the cemented lens abruptly changes, a change in shape of the lens surface is minimized. No adhesive 4 is present in a groove 5 portion corresponding to the air hole 6.

The adhesive 4 can have an adhesion strength suitable for the application purpose and preferably consists of an ultraviolet curable resin. In this case, additional investments are not required, and operators need not learn new knowledge. Therefore, the use of the ultraviolet curable resin is economically advantageous.

The adhesive can have a strength sufficient to temporarily hold the lenses in the cemented lens when the lenses are finally inserted into a lens holder and held by a press ring or the like. However, a cemented lens itself is used as a finished product, an adhesive having a high adhesion power can be used.

In addition, when a lens holder is used as part of a lens, an adhesive for temporarily cementing lenses and an adhesive having a high adhesion power can be selectively used depending on different application locations.

In this embodiment, the peripheral portions of the lenses are adhered at a plurality of locations angularly spaced apart from each other so as to form the air hole. However, these lenses may be cemented to each other along the entire circumferences thereof, and this modification is shown in FIGS. 2A and 2B. The same reference numerals as in FIGS. 1A and 1B denote the same parts in FIGS. 2A and 2B, and a detailed description thereof will be omitted.

FIG. 3 shows another embodiment exemplifying a method of fixing lenses. The respective lenses are chamfered to form grooves open outward when they are combined with each other. The lenses are combined and cemented with each other such that the peripheral portions of the concave surfaces of lenses 8 are brought into contact with each other. An adhesive 4 is filled in the grooves open outward when they are combined with each other, and the circumference of the resultant lens unit is reinforced with an adhesive tape 7.

Although a small projection is formed on the circumference of the resultant lens by the adhesive tape, a sufficiently high strength which allows insertion of the lens into an optical system can be obtained without using a lens holder, thereby reducing the labor for inserting the lens into the lens holder. At the same time, the number of parts used in assembly can be reduced, and the management and material costs can be reduced.

FIG. 4 is a sectional view showing still another embodiment in which the present invention is applied to a camera telephoto lens. A telephoto lens includes lenses L1 to L7 housed in a barrel 10. The lenses L1 to L3 are held in a first holding member 11, the lenses L4 to L6 are held in a second holding member 12, and the lens L7 is held in a third holding member 13. The second holding member 12 is mounted on a movable stage 14. The lenses L4 to L6 are axially moved with movement of the movable stage 14, thereby preforming focusing.

In this telephoto lens, the lenses L4 to L6 constitute a circumferentially cemented lens unit. The lenses L4 and L5 constitute a cemented lens. The lens L6 is cemented with the cemented lens in the same manner as in the above embodiments. More specifically, the diameter of each of the lenses L5 and L6 is 37 mm, and these lenses are in contact with each other at a position corresponding to the diameter of 34.44 mm. These lenses are cemented to each other at a position radially outward from this contact portion. In assembly of the telephoto lens, the lenses L4 to L6 are cemented as the circumferentially cemented lens unit in advance. This lens unit is then inserted into the holding member 12 and is fixed with a press ring 23. Reference numerals 20 to 22 denote press rings of the lenses L1 to L3.

This circumferentially cemented lens unit may have an air hole as in the one shown in FIGS. 1A to 1C, or the one in which the entire circumferences are cemented to each other, as shown in FIGS. 2A and 2B. The circumferentially cemented lens unit may be arranged such that an adhesive tape may be applied to the circumference thereof to reinforce the lens unit, as shown in FIG. 3.

As described above, in a cemented lens according to the present invention, lenses can be simply fixed with a higher centering precision than that in conventional decentering adjustment using a lens holder. Therefore, productivity of the circumferentially cemented lenses of the present invention can be improved.

A cemented lens having a high optical precision can be obtained because decentering caused by fixing first and second lenses in a lens holder can be eliminated.

In addition, when lenses are finely adjusted and cemented, a cemented lens having considerably high performance can be obtained. Even if these lenses are cemented without any fine adjustment, the resultant lens can be sufficiently used depending on application conditions.

From the viewpoint of lens group assembly, the respective lens groups must be conventionally managed at the time of assembly. However, in the cemented lens of the present invention, the lenses can be regarded as a lens unit. For this reason, cumbersome operations need not be performed at the time of assembly and adjustment in view of part management. At the same time, the management cost can be reduced.

The material cost can also be reduced because the lens holder can be omitted. From the viewpoint of product design, a spatial margin in an optical system can be increased, so that a new mechanism may be arranged in an extra space. Alternatively, the lens product can be made compact or the product size can be reduced.

In addition, in a cemented lens of the present invention, an air hole communicating with the internal space between the lenses can be formed utilizing a cementing portion between the lenses. A change in lens surface caused by a change in temperature can be minimized.

What is claimed is:

1. A circumferentially cemented lens unit comprising first and second lenses opposed to each other with a space therebetween on an optical axis thereof, wherein a contact portion of an opposing surface of one of said first and second lenses is disposed inward from the periphery of said one lens with respect to the optical axis and is in contact with a curved opposing optical surface of the other of said first and second lenses near the periphery thereof, and at least one of the opposing surfaces of the first and second lenses is a concave surface, and said first and second lenses are cemented to each other at a portion outward from said contact portion with respect to the optical axis.

2. A lens unit according to claim 1, wherein said first and second lenses are continuously cemented along entire circumferences thereof.

3. A lens unit according to claim 1, wherein said first and second lenses are cemented at a plurality of locations spaced apart from each other along a circumferential direction.

4. A lens unit according to claim 1, wherein a peripheral portion of at least one of said first and second lenses is chamfered to form a groove open radially outward from said contact portion, said groove being filled with an adhesive.

5. A lens unit according to claim 1, wherein an air hole for causing the space to communicate with outer air is formed at said contact portion between said first and second lenses.

6. A lens unit according to claim 1, wherein said first and second lenses have the same outer shape.

7. A lens unit according to claim 1, wherein said first and second lenses are cemented to each other such that a total deviation amount of transmitted light becomes minimum.

8. A lens unit according to claim 1, wherein condition $E_0 < 30$ minutes is satisfied, where $E_0$ is a total deviation amount of transmitted light of said lens unit.

9. A lens unit according to claim 1, wherein condition $E_0 < 1.5$ minutes is satisfied, where $E_0$ is a total deviation amount of transmitted light of said lens unit.

10. A lens unit according to claim 1, wherein condition $E_1 < E_0$ is satisfied, where $E_0$ is a total deviation amount of transmitted light of said lens unit and $E_1$ is a deviation amount of transmitted light of one of the lenses constituting said lens unit.

11. A lens unit according to claim 1, wherein said cemented lens unit uses adhesive that essentially consists of an ultraviolet curable resin.

12. A lens unit according to claim 1, wherein an adhesive tape is adhered to a circumference of said lens unit.

13. A lens system comprising:

a plurality of lenses; and a lens holder for housing said plurality of lenses;

characterized in that at least two of said plurality of lenses are cemented to form a circumferentially cemented lens unit which includes first and second lenses opposed to each other with a space therebetween on an optical axis thereof, a contact portion of an opposing surface of one of said first and second lenses being disposed inward from the periphery of said one lens with respect to the optical axis and being in contact with a curved opposing optical surface of the other of said first and second lenses near the periphery thereof, at least one of the opposing surfaces of the first and second lenses being a concave surface, and said first and second lenses being cemented to each other at a portion outward from said contact portion with respect to the optical axis.

14. A lens system according to claim 13, wherein said first and second lenses are continuously cemented along entire circumferences thereof.

15. A lens system according to claim 13, wherein said first and second lenses are cemented at a plurality of locations spaced apart from each other along a circumferential direction.

16. A lens system according to claim 13, wherein a peripheral portion of at least one of said first and second lenses is chamfered to form a groove open radially outward from said contact portion, said groove being filled with an adhesive.

17. A lens system according to claim 13, wherein an air hole for causing the space to communicate with outer air is formed at said contact portion between said first and second lenses.

18. A lens system according to claim 13, wherein said first and second lenses have the same outer shape.

19. A lens system according to claim 13, wherein said first and second lenses are cemented to each other such that a total deviation amount of transmitted light becomes minimum.

20. A lens system according to claim 13, wherein condition $E_0 < 30$ minutes is satisfied, where $E_0$ is a total deviation amount of transmitted light of said lens system.

21. A lens system according to claim 13, wherein condition $E_0 < 1.5$ minutes is satisfied, where $E_0$ is a total deviation amount of transmitted light of said lens system.

22. A lens system according to claim 13, wherein condition $E_1 < E_0$ is satisfied, where $E_0$ is a total deviation amount of transmitted light of said lens system and $E_1$ is a deviation amount of transmitted light of one of the lenses constituting said lens system.

23. A lens system according to claim 13, wherein said cemented lens unit uses adhesive that essentially consists of an ultraviolet curable resin.

24. A lens system according to claim 13, wherein an adhesive tape is adhered to a circumference of said lens unit.

25. A lens system according to claim 13, further including a press ring for fixing said lens unit in said lens holder.

26. A lens unit according to claim 1, wherein said curved opposing optical surface is a concave surface.

27. A lens unit according to claim 13, wherein said curved opposing optical surface is a concave surface.

\* \* \* \* \*

UNITED STATES PATENT AND TRADEMARK OFFICE
CERTIFICATE OF CORRECTION

PATENT NO. : 5,570,237
DATED      : October 29, 1996
INVENTOR(S) : Susumu Sato

It is certified that error appears in the above-indentified patent and that said Letters Patent is hereby corrected as shown below:

On the Title Page:

Item [21], Appl. No.: 225,952 should read:

--Appl. No.: 255,952--.

Signed and Sealed this

Eighteenth Day of February, 1997

Attest:

BRUCE LEHMAN

Attesting Officer                    Commissioner of Patents and Trademarks